(12) United States Patent
Paulson et al.

(10) Patent No.: US 10,577,079 B2
(45) Date of Patent: Mar. 3, 2020

(54) DUAL BLADE FOLD BOLTS AND INBOARD CENTRIFUGAL BEARING IN A FOLDING ROTOR BLADE ASSEMBLY

(71) Applicant: Bell Helicopter Textron Inc., Fort Worth, TX (US)

(72) Inventors: Jared Mark Paulson, Fort Worth, TX (US); Tyler Wayne Baldwin, Keller, TX (US); Kyle Thomas Cravener, Watauga, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 24 days.

(21) Appl. No.: 15/845,928

(22) Filed: Dec. 18, 2017

(65) Prior Publication Data

US 2019/0185141 A1 Jun. 20, 2019

(51) Int. Cl.
*B64C 11/28* (2006.01)
*B64C 29/00* (2006.01)
*B64C 3/56* (2006.01)

(52) U.S. Cl.
CPC ............... *B64C 11/28* (2013.01); *B64C 3/56* (2013.01); *B64C 29/0033* (2013.01)

(58) Field of Classification Search
CPC ....... B64C 11/28; B64C 3/56; B64C 29/0033; B64C 27/35
See application file for complete search history.

(56) References Cited

U.S. PATENT DOCUMENTS

| | | |
|---|---|---|
| 2,623,713 A | 12/1952 | Foster |
| 2,658,576 A | 11/1953 | Mosinskis |
| 3,026,942 A | 3/1962 | Cresap |
| 3,153,455 A | 10/1964 | Mosinskis |
| 3,625,631 A | 12/1971 | Covington, Jr. et al. |
| 3,652,185 A | 3/1972 | Cresap et al. |
| 3,967,918 A | 7/1976 | Mouille et al. |
| 4,252,504 A | 2/1981 | Covington et al. |
| 4,257,739 A | 3/1981 | Covington et al. |
| 4,268,222 A | 5/1981 | Bernard |
| 4,427,340 A | 1/1984 | Metzger et al. |
| 4,522,563 A | 6/1985 | Reyes et al. |
| 4,691,878 A | 9/1987 | Vaughan et al. |
| 5,031,858 A | 7/1991 | Schellhase et al. |
| 5,059,094 A | 10/1991 | Robinson et al. |
| 5,096,380 A | 3/1992 | Byrnes et al. |
| 5,337,974 A | 8/1994 | Rumberger et al. |
| 5,358,381 A | 10/1994 | Covington et al. |
| 5,645,400 A | 7/1997 | Hunter et al. |

(Continued)

OTHER PUBLICATIONS

Paulson, Jared Mark, "U.S. Appl. No. 15/845,720", filed Dec. 18, 2017.

(Continued)

*Primary Examiner* — Nathaniel E Wiehe
*Assistant Examiner* — David Whittaker
(74) *Attorney, Agent, or Firm* — Winstead PC

(57) ABSTRACT

A folding rotor blade assembly for a tiltrotor aircraft comprising a rotor blade pivotally connected to a yoke with dual concentric blade bolts having a common central axis providing a pivotal axis inboard of an outboard shear bearing. In use, the compact folded arrangement of the rotor blades reduces folded aircraft dimensions in response to ever increasing restricted storage space parameters.

20 Claims, 7 Drawing Sheets

(56) References Cited

U.S. PATENT DOCUMENTS

| | | | |
|---|---|---|---|
| 6,036,442 | A | 3/2000 | Certain et al. |
| 7,530,790 | B2 | 5/2009 | Cabrera et al. |
| 8,360,727 | B2 | 1/2013 | Stamps et al. |
| 9,156,545 | B1 | 10/2015 | Fenny et al. |
| 9,169,010 | B2 | 10/2015 | Foskey et al. |
| 9,499,262 | B2 | 11/2016 | Foskey et al. |
| 2004/0026564 | A1 | 2/2004 | Romani et al. |
| 2013/0149151 | A1 | 6/2013 | Rauber et al. |
| 2014/0271199 | A1 | 9/2014 | Maresh et al. |
| 2014/0271222 | A1 | 9/2014 | Maresh et al. |
| 2015/0125300 | A1 | 5/2015 | Stamps et al. |
| 2016/0152329 | A1* | 6/2016 | Tzeng ............... B64C 29/0033 416/134 R |
| 2017/0144746 | A1* | 5/2017 | Schank ............... B64C 11/28 |
| 2017/0320567 | A1 | 11/2017 | Miller et al. |
| 2018/0229830 | A1 | 8/2018 | Foskey et al. |
| 2018/0244377 | A1 | 8/2018 | Chan |

OTHER PUBLICATIONS

Paulson, Jared Mark, "U.S. Appl. No. 15/845,810", filed Dec. 18, 2017.

Paulson, Jared Mark, "U.S. Appl. No. 15/845,876", filed Dec. 18, 2017.

Paulson, Jared Mark, "U.S. Appl. No. 15/845,967", filed Dec. 18, 2017.

Paulson, Jared Mark, "U.S. Appl. No. 15/846,011", filed Dec. 18, 2017.

Cravener, Kyle Thomas, "U.S. Appl. No. 15/963,516", filed Apr. 26, 2018.

Paulson, Jared Mark, "U.S. Appl. No. 16/016,280", filed Jun. 22, 2018.

* cited by examiner

DUAL BLADE FOLD BOLTS AND INBOARD CENTRIFUGAL BEARING IN A FOLDING ROTOR BLADE ASSEMBLY

CROSS-REFERENCE TO RELATED APPLICATIONS

This patent application is related to U.S. Patent Application entitled "Split Yoke In A Folding Rotor Blade Assembly," Ser. No. 15/845,720; U.S. Patent Application entitled "Compact Folding Yoke In A Folding Rotor Blade Assembly," Ser. No. 15/845,810; U.S. Patent Application entitled "Compact Folding Yoke With Flexible Yoke Arms In A Folding Rotor Blade Assembly," Ser. No. 15/845,876; U.S. Patent Application entitled "Folding Spindle And Bearing Assembly In A Folding Rotor Blade Assembly," Ser. No. 15/845,967; and U.S. Patent Application entitled "Outboard Centrifugal Force Bearing With Inboard Blade Fold Axis In A Folding Rotor Blade Assembly," Ser. No. 15/846,011. Each patent application identified above is filed on the same date as this patent application and is incorporated herein by reference in its entirety.

BACKGROUND

This section provides background information to facilitate a better understanding of the various aspects of the disclosure. It should be understood that the statements in this section of this document are to be read in this light, and not as admissions of prior art.

Rotorcraft and tiltrotor aircraft are often transported or stored on vessels or in areas where storage space is limited. In order to reduce the space that each aircraft occupies such that the maximum number of aircraft can be accommodated within the limited storage space, the blade assemblies of some rotor systems can be folded so that each rotor blade is generally parallel with each other in order to reduce the overall profile of the blade assembly. Typically, each rotor blade is folded about a single pivot point positioned outboard of the yoke that attaches the rotor blade to the central drive mast. The single pivot point is also necessarily outboard of a set of inboard and outboard bearings that connect the rotor blade to the yoke. The distance between the inboard and outboard bearings is dependent on aircraft configuration where each configuration has an optimal distance for that particular aircraft's loads and dynamics. As a result, in order to not interfere with the bearings and preserve the optimal distance between the bearings, the pivot point of each rotor blade is typically at least that optimal distance out from the inboard connection of the rotor blade to the yoke.

In an effort to transport or store larger numbers of rotorcraft and tiltrotor aircraft, current naval vessels have reduced the allotted storage space available for each aircraft. Present rotor blade folding systems cannot accommodate the reduced space parameters. This requirement necessitates a tighter grouping of the rotor blades than is currently available by prior art rotor blade folding systems.

SUMMARY

An example folding rotor blade assembly for a tiltrotor aircraft includes a drive mast connected to a hub spring assembly, a yoke connected to the hub spring assembly, an inboard bearing assembly connected to the yoke, an outboard bearing assembly connected to the yoke opposite the hub spring assembly, a grip connected to the inboard bearing assembly and connected to the outboard bearing assembly, a blade fold support connected to the grip and abutting the outboard bearing assembly, and a rotor blade connected to the blade fold support at a pivotal connection positioned inboard of the outboard bearing assembly.

An example folding rotor blade assembly includes a yoke connected to an axially aligned with a hub spring assembly, an inboard clamp, housing an inboard shear bearing, connected to the yoke proximate the hub spring assembly, an inboard beam, housing an inboard centrifugal force ("CF") bearing, connected to the yoke wherein the inboard shear bearing is connected to the inboard CF bearing, a spindle connected to a tip of the yoke and connected to an outboard shear bearing, an outboard beam connected to a grip and the outboard shear bearing, a blade fold support connected to the grip and the outboard beam, and a rotor blade connected to the blade fold support at a pivotal connection positioned inboard of the outboard shear bearing.

An example method includes pitching a rotor blade of a rotor blade assembly comprising an inboard bearing assembly connected to a yoke and a grip, an outboard bearing assembly connected to the yoke and the grip, a blade support connected to the grip and the outboard bearing assembly, and a rotor blade connected to the blade support at a lockable connection and at a pivotable connection with axially aligned blade bolts providing a pivot axis inboard of the outboard bearing assembly, unlocking the lockable connection, and rotating the rotor blade about the pivot axis.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
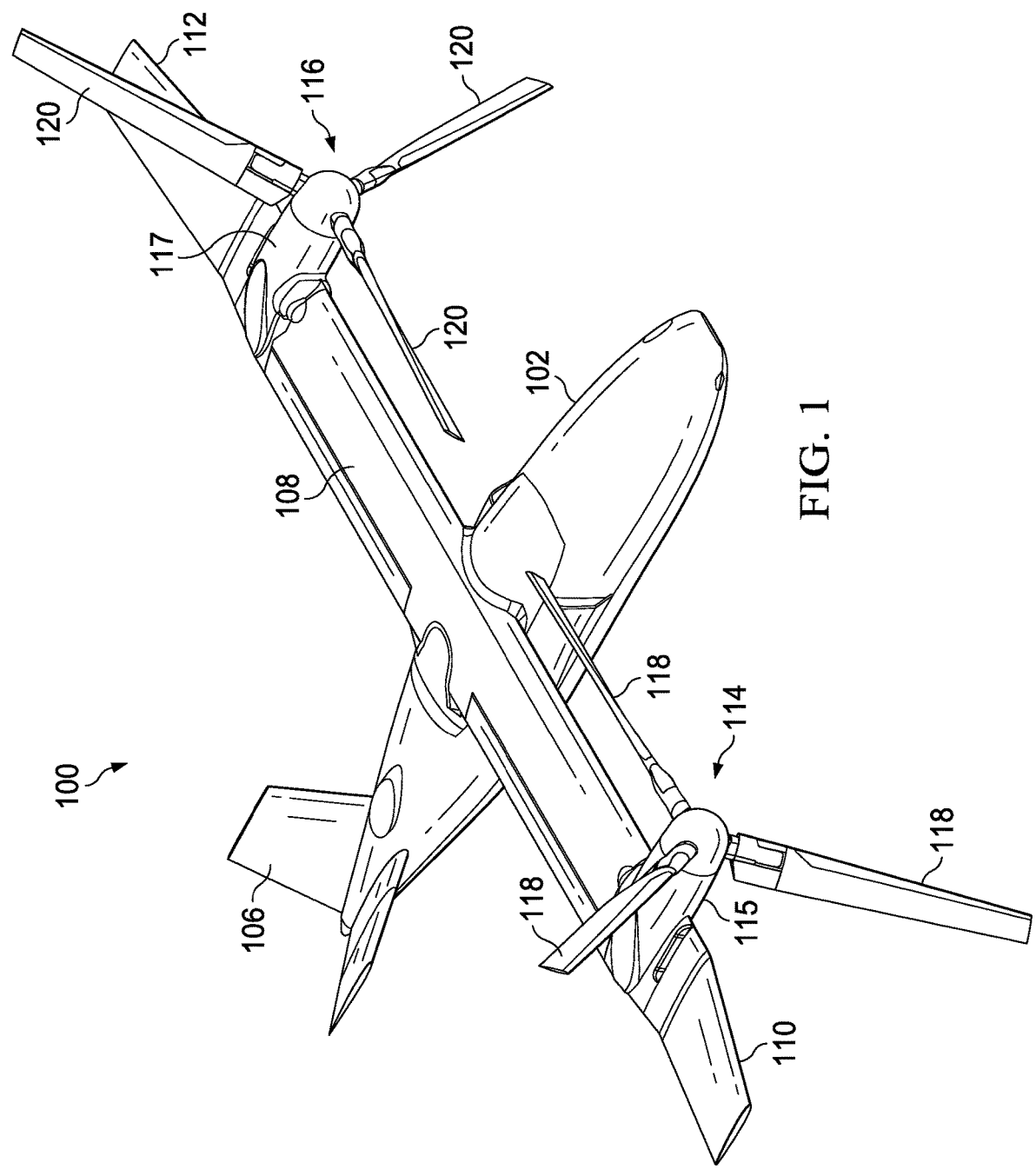
FIG. 1 is a perspective view of a tiltrotor aircraft in a flight ready position according to aspects of the disclosure.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

Figure 2:
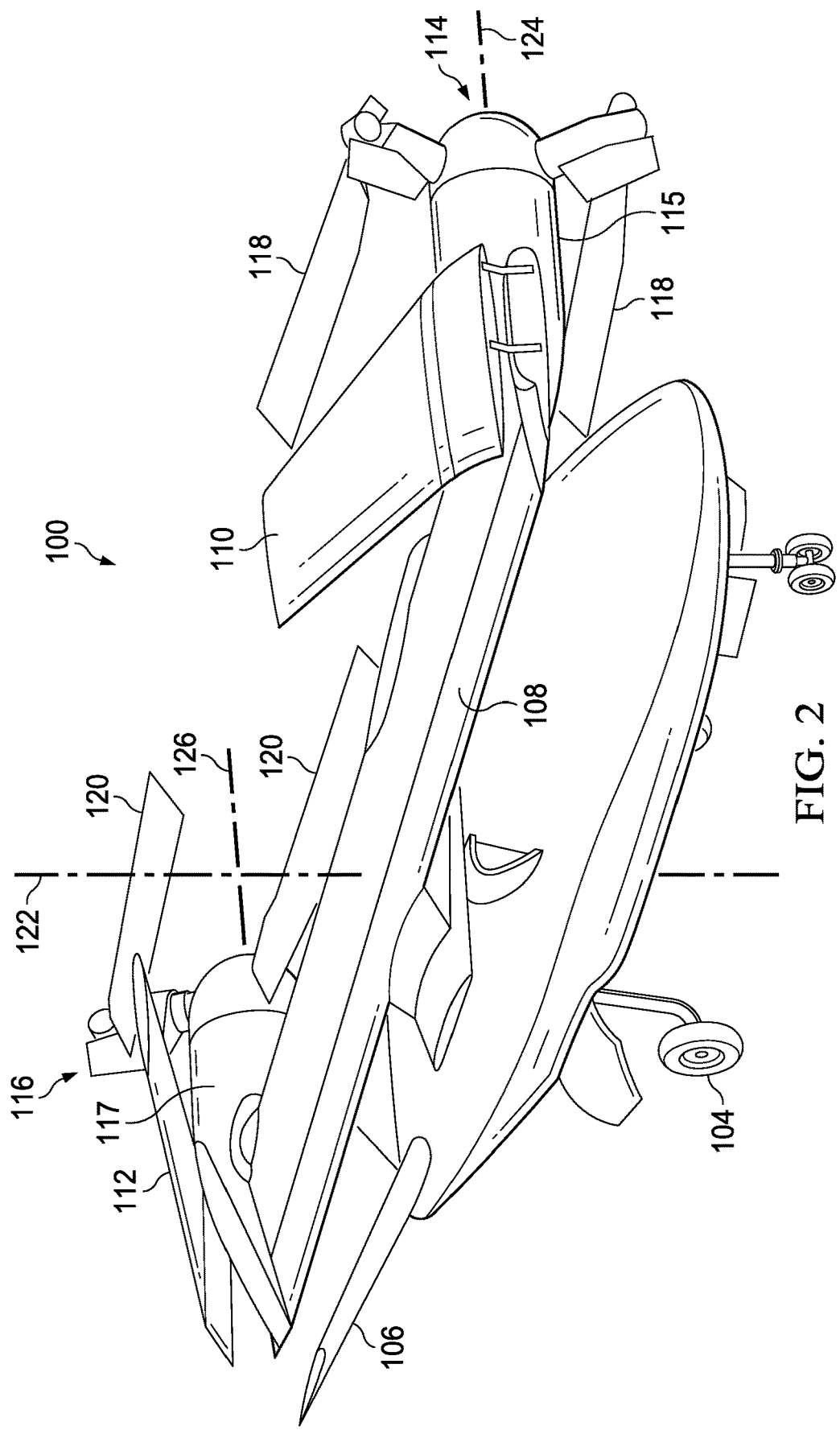
FIG. 2 is a perspective view of a tiltrotor aircraft in a stowed position according to aspects of the disclosure.

Referring to FIGS. 1 and 2, an illustrative tiltrotor aircraft 100 is shown. Tiltrotor aircraft 100 includes fuselage 102, landing gear 104, tail member 106, wing 108, wing tip 110, wing tip 112, rotor system 114, and rotor system 116. Rotor system 114 is housed within nacelle 115 located on an end portion of wing 108 proximate wing tip 110, while rotor system 116 is housed within nacelle 117 located on an opposite end portion of wing 108 proximate wing tip 112. Wing tip 110 is pivotable at a location on wing 108 outboard of nacelle 115. Wing tip 112 is pivotable at a location on wing 108 outboard of nacelle 117. Nacelles 115 and 117 are pivotable between a helicopter mode where the rotor systems are generally vertical and an airplane mode where the rotor systems are generally horizontal. Nacelle 115 and nacelle 117 are substantially symmetric of each other about fuselage 102. Rotor system 114 includes a plurality of foldable rotor blades 118. Rotor system 116 includes a plurality of foldable rotor blades 120. Rotor blades 118 and 120 may rotate in opposite directions to cancel the torque associated with the operation of each rotor system 114 and 116. The angle of the pivotable nacelles 115 and 117 relative to the wing, as well as the pitch of rotor blades 118 and 120, can be adjusted in order to selectively control direction, thrust, and lift of tiltrotor aircraft 100. Further, rotor systems 114 and 116 are illustrated in the context of tiltrotor aircraft 100; however, a singular rotor system with foldable rotor blades can be implemented on other non-tilting rotor and helicopter rotor systems. It should also be appreciated that teachings from tiltrotor aircraft 100 may apply to other aircraft such as airplanes and unmanned aircraft which would benefit from folding rotor blades.

Fuselage 102 represents the body of tiltrotor aircraft 100 and may be coupled to rotor systems 114 and 116 such that the rotor systems with rotor blades 118 and 120 may move tiltrotor aircraft 100 through the air. Landing gear 104 supports tiltrotor aircraft 100 when tiltrotor aircraft 100 is landing or when tiltrotor aircraft 100 is at rest on the ground. Vertical axis 122 is generally perpendicular to the longitudinal axis of the wing and is generally positioned at the intersection of the fuselage and the wing. FIG. 1 represents tiltrotor aircraft 100 in operational flying position in an airplane mode. FIG. 2 represents tiltrotor aircraft 100 in a stowed position where rotor blades 118 have been folded generally parallel with each other and rotor blades 120 have been folded generally parallel with each other in order to reduce the dimensions of the aircraft to whatever degree is required in response storage space restrictions. In the stowed position, wing 108 is swivelled approximately 90° to generally align with fuselage 102.

Generally each rotor system includes a mast driven by a power source. A rotor system includes a yoke connected to the mast and rotor blades indirectly connected to the yoke with bearings. The bearings are generally elastomeric bearings constructed from a rubber type material that absorb vibration. There may be inboard bearings connecting a cuff or grip of a rotor blade to the yoke proximate the mast and outboard bearings connecting the rotor blade to an outboard end of the yoke. The cuff or grip may be separate from the rotor blade or may be integrally formed with the rotor blade. Other combinations of inboard and outboard bearings with or without cuffs or grips are possible as well as the removal of one or the other bearings. The bearings accommodate forces acting on the rotor blades allowing each rotor blade to flex with respect to the yoke/mast and other rotor blades. The weight of the rotor blades and the lift of rotor blades may result in transverse forces on the yoke and other components. Examples of transverse forces may include forces resulting from flapping and coning of the rotor blades. Flapping generally refers to the up-and-down movement of a rotor blade positioned at a right angle to the plane of rotation. Coning generally refers to the upward flexing of a rotor blade due to lift forces acting on the rotor blade. The rotor blades may be subject to other forces, such as axial, lead/lag, and feathering forces. Axial forces generally refer to the centrifugal force on the rotor blades during rotation of the rotor blades. Lead and lag forces generally refer to forces resulting from the horizontal movement of the rotor blades about a vertical pin occurring if, for example, the rotor blades do not rotate at the same rate as the yoke. Feathering forces generally refer to forces resulting from twisting motions that cause a rotor blade to change pitch. The power source, mast, and yoke are components for transmitting torque. The power source may include a variety of components including an engine, a transmission, and differentials. In operation, the mast receives torque from the power source and rotates the yoke. Rotation of the yoke causes the rotor blades to rotate with the mast and yoke.

Figure 3:
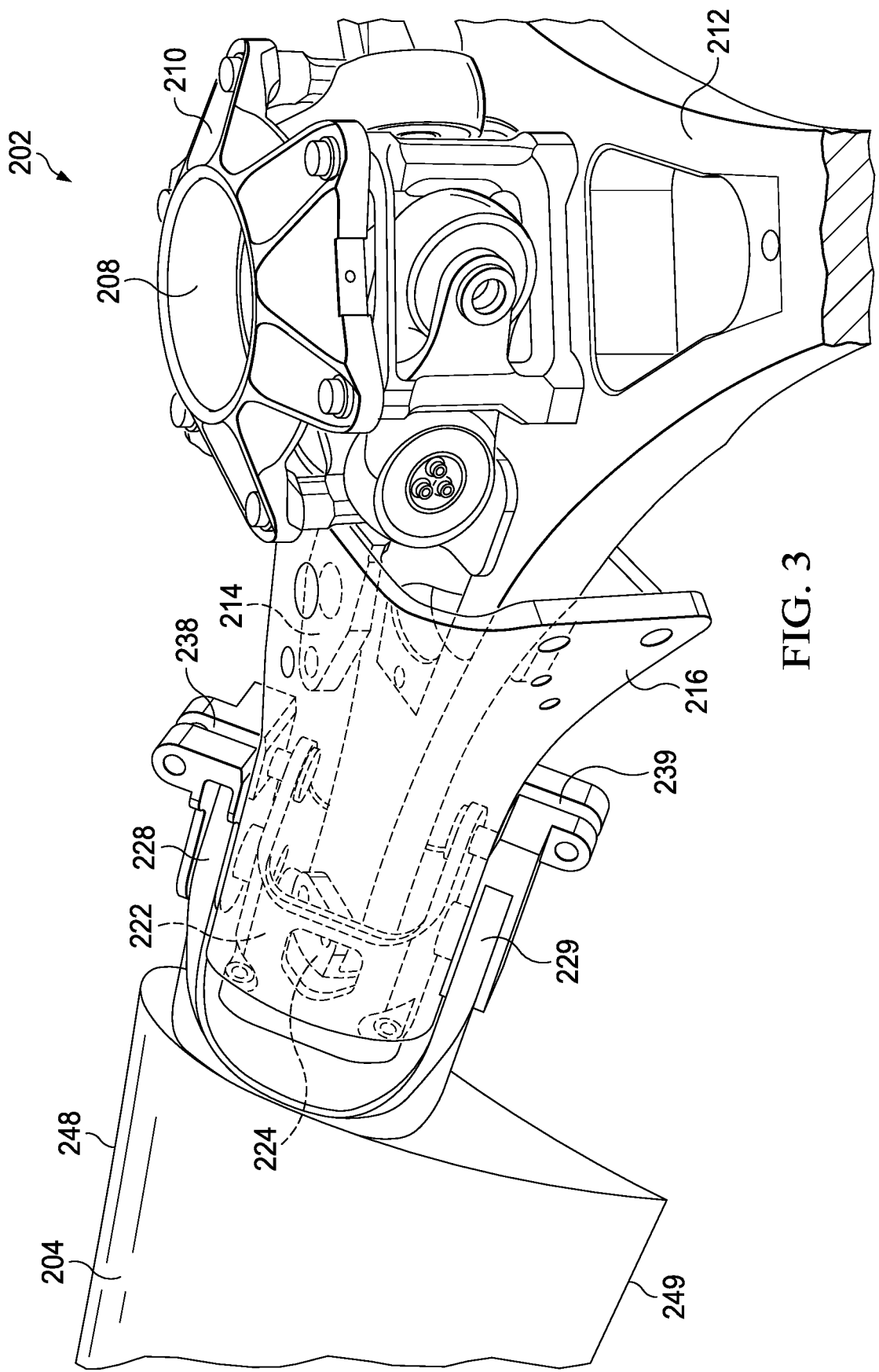
FIG. 3 is a partial perspective view of a blade assembly in an unfolded position according to one or more aspects of the disclosure.
Figure 4:
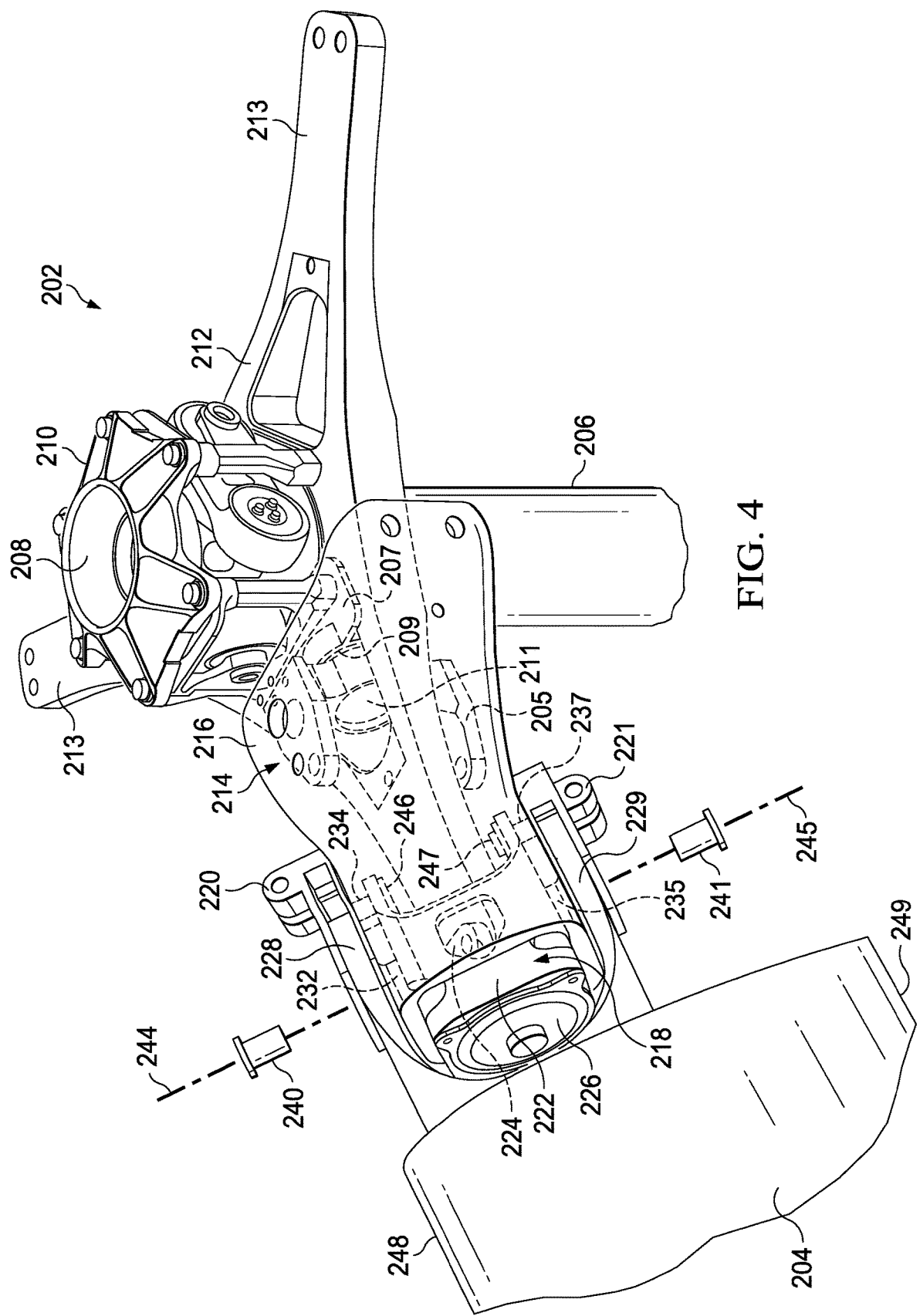
FIG. 4 is a partial perspective view of a blade assembly in an unfolded position according to one or more aspects of the disclosure.

Referring to FIGS. 3 and 4, blade assembly 202 is shown in an unfolded position. Each rotor system 114 and 116 comprises a separate blade assembly. In the interest of clarity, a single blade assembly is described herein with the understanding that tiltrotor aircraft 100 comprises a pair of similarly configured blade assemblies. In the unfolded position, each rotor blade of blade assembly 202 is generally equally spaced from each other around a mast. For example, in the three rotor blade configuration shown, 120° separates each rotor blade. It should also be appreciated that teachings regarding blade assembly 202 can apply to blade assemblies having greater or fewer rotor blades.

Mast 206 is connected to hub spring assembly 210 through central opening 208. Yoke 212 is mounted to hub spring assembly 210 through a central aperture axially aligned with central opening 208. Yoke 212 includes equally spaced extensions 213 extending radially from the central aperture. A rotor arm is connected to yoke 212 at each extension. In the interest of clarity, a single connection between a yoke arm extension and a rotor blade is described herein with the understanding that blade assembly 202 comprises a similarly configured connection for each extension, rotor blade interface.

Inboard bearing assembly 214 connects yoke 212 to grip 216 via an inboard shear bearing and an inboard CF bearing. Inboard bearing assembly 214 includes inboard beam 205, clamp plate 207, inboard shear bearing 209, and an inboard centrifugal force ("CF") bearing 211. Clamp plate 207 is mounted to yoke 212 proximate hub spring assembly 210. Clamp plate 207 houses inboard shear bearing 209. Inboard beam 205 is connected to grip 216 outboard of clamp plate 207. Inboard beam houses inboard CF bearing 211. Inboard shear bearing 209 is connected to inboard CF bearing 211. Outboard bearing assembly 218 connects yoke extension 213 to grip 216 via an outboard shear bearing. Outboard bearing assembly 218 includes outboard beam 222, spindle, 224, and outboard shear bearing 226. Spindle 224 is mounted to a tip of yoke extension 213 outboard of inboard bearing assembly 214. Outboard shear bearing 226 extends from spindle 224 to outboard beam 222. Outboard beam 222 is connected to grip 216 and blade fold supports 220, 221.

Blade fold support 220 includes stanchions 232 and 234. Blade fold support 221 includes stanchions 235 and 237. Stanchions 232 and 234 extend from blade fold support 220 through grip 216 and abut outboard beam 222. Stanchions 235 and 237 extend from blade fold support 221 through grip 216 and abut outboard beam 222. Blade fold supports 220, 221 are mounted to grip 216 with blade fold bolts 240, 241 through stanchions 232, 235, respectively. Blade fold supports 220, 221 are mounted to grip 216 with bolts 246, 247 through stanchions 234, 237, respectively. Stanchions 234, 237 prevent rotation of blade fold supports, 220, 221, respectively, with respect to grip 216. Blade fold support 220 includes slot 238 and blade fold support 221 includes slot 239.

Blade tangs 228, 229 extend from rotor blade 204. Blade tangs 228, 229 are pivotally connected to blade fold supports 220, 221, respectively. The blade tangs are connected to the blade fold supports with dual, axially aligned blade fold bolts 240, 241 through stanchions 232, 235, respectively. Blade fold bolt 240 has central axis 244. Blade fold bolt 241 has central axis 245. Central axes 244, 245 are collinear. Rotor blade 204 and blade tangs 228, 229 are rotatable about collinear central axes 244, 245 relative to blade fold supports 220, 221, grip 216, and outboard bearing assembly 218. Central axes 244, 245 are on the centrifugal force ("CF") path of rotor blade 204. The centrifugal force ("CF") load path on each rotor blade is from the blade tangs, through the blade fold bolts 240, 241, to the grip, to the inboard beam, and to the yoke. Rotor blade 204 includes leading edge 248 and trailing edge 249.

Figure 5:
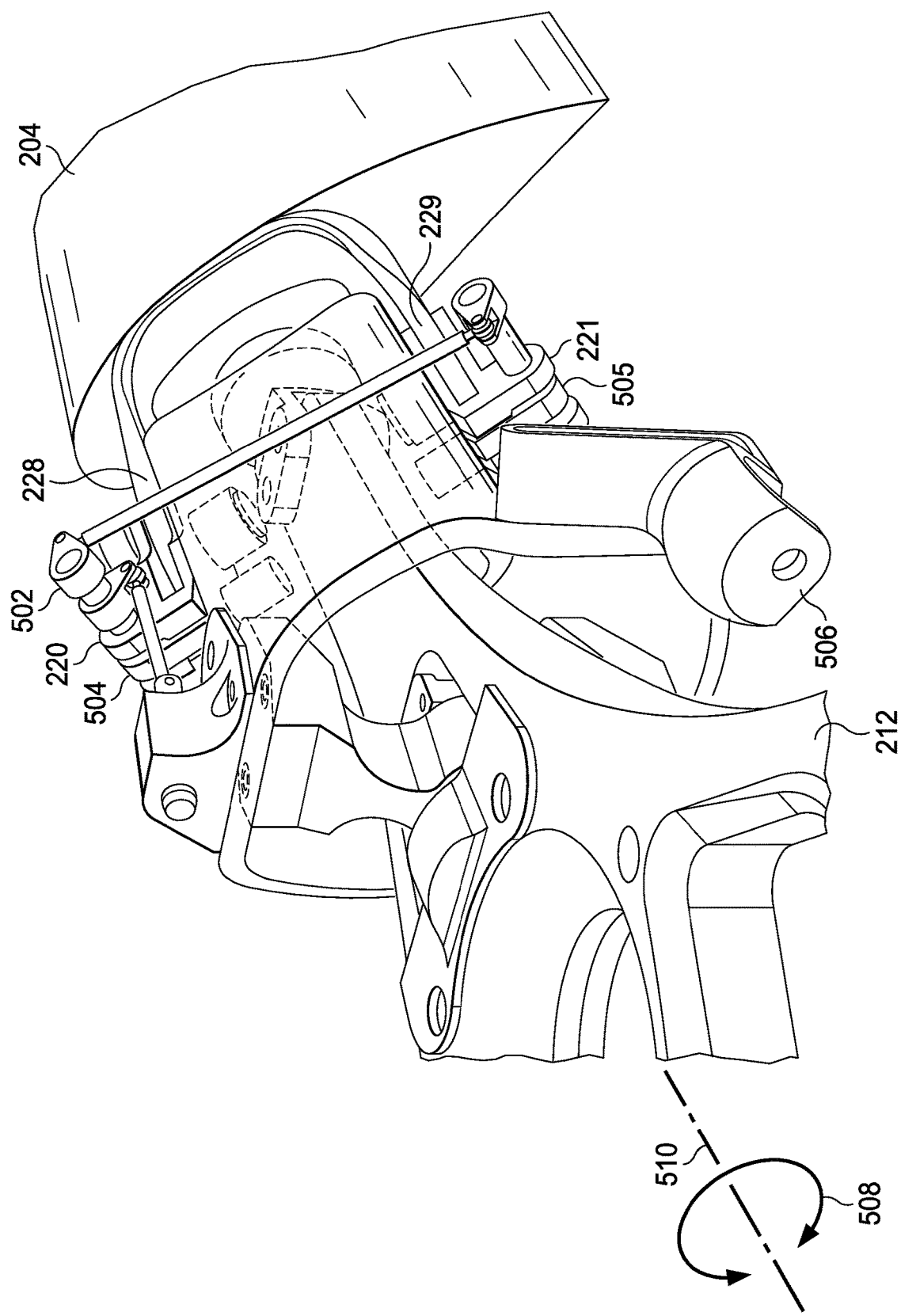
FIG. 5 is a partial perspective view of a rotor blade connection in an unfolded position according to one or more aspects of the disclosure.

Referring to FIG. 5, blade tangs 228, 229 are locked in the unfolded position by lock mechanism 502 (e.g., a tang lock, latch lock) attached to blade fold supports 220, 221. Lock mechanism 502 includes tabs 504, 505 sized and shaped to engage slots 238, 239, respectively. Tabs 504, 505 releasably engage blade tangs 228, 229. The lock mechanism locks each blade tang, thus the rotor arm, in the unfolded position and when unlocked, allows each rotor blade to rotate relative to the blade fold supports. Actuators are operatively connected to lock mechanism 502 to move tabs 504, 505 in and out of engagement with the blade tangs. Lock mechanism locks/unlocks the rotor blades to the blade fold supports.

A swash plate is connected to mast 206. Pitch links extend from the swash plate. The pitch links are connected to pitch horns 506. The swash plate, pitch links, and pitch horns are operatively connected to an actuator to pitch the rotor blades relative to yoke 212 in direction 508 about central longitudinal axis 510 of each rotor blade. Central longitudinal axis 510 may also be referred to as a blade pitch change axis. Each rotor blade is free to rotate or "pitch" about its central longitudinal axis with respect to the yoke in a range between 0° to 90°.

Figure 6:
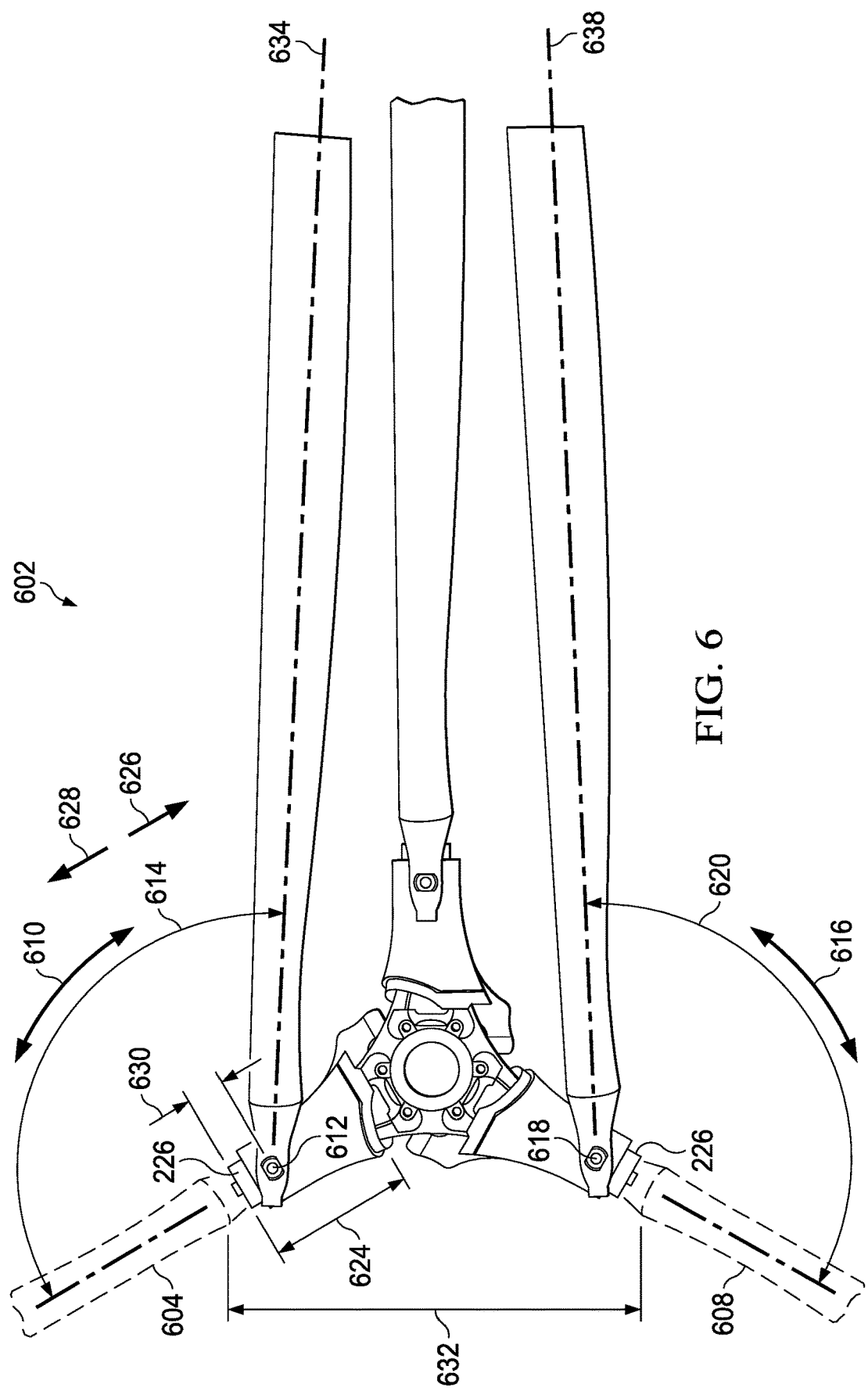
FIG. 6 is a top view of a rotor blade assembly in a folded position according to aspects of the disclosure.

Referring to FIG. 6, blade assembly 602 is shown in a folded position. Unfolded rotor blade 604 and unfolded rotor blade 608 are depicted in shadow. Rotor blade 604 has central longitudinal axis 634. Rotor blade 608 has central longitudinal axis 638. Rotor blade 604 is rotated in direction 610 at pivot point 612 about collinear central axes 244, 245 through angle 614. Rotor blade 608 is rotated in direction 616 at pivot point 618 about collinear central axes 244, 245 through angle 620. Axially aligned blade bolts 240, 241 including collinear central axes 244, 245 at pivot points 612 and 618 provide pivot axes for the rotor blade with respect to the grip. Actuators are operatively connected to the rotor blades to facilitate rotational movement of the rotor blades about the pivot points. Angles 614 and 620 may be in the range of 90° to 180°. Physical stops or proximity sensors signal the actuators to cease rotational movement of the rotor blades.

Rotor blade 604 cannot rotate at pivot point 612 until lock mechanism 502 moves tabs 504, 505 from engagement with the blade tangs of rotor blade 604. Rotor blade 608 cannot rotate at pivot point 618 until lock mechanism 502 moves tabs 504, 505 from engagement with the blade tangs of rotor blade 608. Actuators are connected to tabs 504, 505 to move the tabs free from engagement with the blade tangs.

Distance 624 is the spacing between the inboard shear bearing and outboard shear bearing 226. Distance 624 is an optimal distance between the inboard shear bearing and the outboard shear bearing for a rotor blade assembly of a particular aircraft. The distance is dependent on the particular aircraft's loads and dynamics. Inboard direction 626 points toward the drive mast 206 of a blade assembly while outboard direction 628 points away from the drive mast along the longitudinal axis of a rotor blade. Pivot points 612 and 618 are positioned inboard of the outboard shear bearing 226 of each rotor blade. Pivot points 612 and 618 are located a distance 630 in the inboard direction 626 from the outboard shear bearing 226 of rotor blades 604 and 608, respectively. Distance 630 is measured along the central longitudinal axis 634 and 638 of rotor blades 604 and 608, respectively. Pivot points 612 and 618 are positioned on central longitudinal axes 634 and 638, respectively. The pivot point of each rotor blade positioned inboard of the outboard shear bearing allows folded profile 632 to be less than if the pivot point were outboard of the outboard shear bearing.

Figure 7:
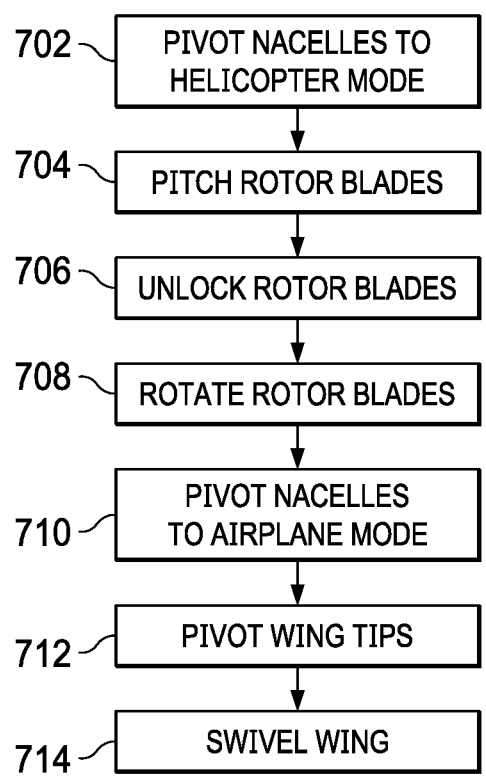
FIG. 7 is a flowchart of the actions performed in converting a tiltrotor aircraft from a flight ready position to a stowed position according to aspects of the disclosure.

Referring to FIG. 7, the actions performed in converting tiltrotor aircraft 100 from a flight ready position to a stowed position are shown. At block 702, nacelles 115 and 117 which house rotor systems 114 and 116, respectively, are pivoted to helicopter mode. Each nacelle is rotated nose up to approximately 90° nacelle angle. A 90° nacelle angle is where the longitudinal axis of the nacelle is generally vertical relative to the ground. The blade assemblies of each rotor system are generally horizontal. At block 704, each rotor blade is pitched about its central longitudinal axis to high collective position. High collective is when the leading edge of each rotor blade is generally facing upward. This is referred to as indexing the rotor blades. Actuators operatively connected to pitch horns 506 facilitate the change in pitch of the rotor blades.

At block 706, each to-be-folded rotor blade is unlocked from blade supports 220, 221. Actuators operatively connected to lock mechanism 502 facilitate temporary removal of tabs 504, 505 from engagement with the blade tangs of each to-be-folded rotor blade. The position and quantity of identified to-be-folded rotor blades can vary depending on rotor blade assembly configuration (e.g., two of the three blades in the illustrated embodiment are folded). At block 708, each to-be-folded rotor blade is rotated about the pivot axis provided by the collinear central axes 244, 245 of blade bolts 240, 241. Each rotor blade is rotated relative to the blade fold supports. Actuators operatively connected to the rotor blades facilitate the rotational movement of the rotor blades. The rotor blades are rotated toward the fuselage until the rotor blades are generally parallel with each other at which point physical stops or proximity sensors signal the actuators to cease movement of the rotor blades. At block 710, nacelles 115 and 117 are pivoted to airplane mode. Each nacelle is rotated to approximately 0° nacelle angle. A 0° nacelle angle is where the longitudinal axis of the nacelle is generally horizontal relative to the ground. The blade assemblies of each rotor system remain generally horizontal. At block 712, wing tips 110 and 112 are pivoted toward the fuselage. At block 714, wing 108 is swivelled about vertical axis 122 to lie above and generally align with the fuselage. The entire sequence of converting tiltrotor aircraft 100 from an operational flight ready position to a stowed position can be completed in a range of 1 to 2 minutes in a wind of up to at least 60 knots. It can be interrupted or stopped at any point to facilitate maintenance. Manual operation is possible in the event of a system failure. It is to be understood that several of the previous actions may occur simultaneously or in different order. The order of actions disclosed is not meant to be limiting.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A folding rotor blade assembly for a tiltrotor aircraft, comprising:
    a drive mast connected to a hub spring assembly;
    a yoke connected to the hub spring assembly;
    an inboard bearing assembly connected to the yoke;
    an outboard bearing assembly connected to the yoke opposite the hub spring assembly;
    a grip connected to the inboard bearing assembly and connected to the outboard bearing assembly;
    a blade fold support connected to the grip and abutting the outboard bearing assembly; and
    a rotor blade connected to the blade fold support at a pivotal connection positioned inboard of the outboard bearing assembly.

2. The folding rotor blade assembly of claim 1, wherein the outboard bearing assembly further comprises an outboard shear bearing.

3. The folding rotor blade assembly of claim 1, wherein the inboard bearing assembly further comprises an inboard shear bearing and an inboard centrifugal force ("CF") bearing.

4. The folding rotor blade assembly of claim 1, wherein the outboard bearing assembly further comprises:
    an outboard beam connected to the grip and connected to an outboard shear bearing; and
    a spindle connected to the outboard shear bearing and connected to a tip of the yoke.

5. The folding rotor blade assembly of claim 1, wherein the inboard bearing assembly further comprises:
    an inboard beam connected to the grip and connected to an inboard centrifugal force ("CF") bearing;
    a clamp plate connected to the yoke and connected to an inboard shear bearing; and
    the inboard shear bearing connected to the inboard centrifugal force ("CF") bearing.

6. The folding rotor blade assembly of claim 1, further comprising a lock mechanism connected to the blade fold support and releasably engaged with the rotor blade.

7. The folding rotor blade assembly of claim 6, wherein the rotor blade is releasably engaged with the lock mechanism by a blade tang.

8. The folding rotor blade assembly of claim 1, further comprising a pair of axially aligned blade fold bolts at the pivotal connection providing a pivot axis of the rotor blade relative to the blade fold support.

9. The folding rotor blade assembly of claim 1, wherein the blade fold support further comprises:
    a first stanchion extending through the grip to the outboard bearing assembly at the pivotal connection; and
    a second stanchion extending through the grip to the outboard bearing assembly preventing rotation of the blade fold support relative to the grip.

10. A folding rotor blade assembly, comprising:
    a yoke connected to an axially aligned with a hub spring assembly;
    an inboard clamp, housing an inboard shear bearing, connected to the yoke proximate the hub spring assembly;
    an inboard beam, housing an inboard centrifugal force ("CF") bearing, connected to the yoke wherein the inboard shear bearing is connected to the inboard CF bearing;
    a spindle connected to a tip of the yoke and connected to an outboard shear bearing;
    an outboard beam connected to a grip and the outboard shear bearing;
    a blade fold support connected to the grip and the outboard beam; and
    a rotor blade connected to the blade fold support at a pivotal connection positioned inboard of the outboard shear bearing.

11. The folding rotor blade assembly of claim 10, further comprising a lock mechanism connected to the blade fold support and releasably engaged with the rotor blade.

12. The folding rotor blade assembly of claim 11, wherein the rotor blade is releasably engaged with the lock mechanism by a blade tang.

13. The folding rotor blade assembly of claim 10, further comprising axially aligned blade fold bolts at the pivotal connection providing a pivot axis of the rotor blade relative to the blade fold support.

14. The folding rotor blade assembly of claim 13, wherein the rotor blade includes a central force path positioned on the pivot axis.

15. The folding rotor blade assembly of claim 10, wherein the blade fold support further comprises:
    a first stanchion extending through the grip to the outboard beam at the pivotal connection; and
    a second stanchion extending through the grip to the outboard beam.

16. A method comprising:
pitching a rotor blade of a rotor blade assembly comprising an inboard bearing assembly connected to a yoke and a grip, an outboard bearing assembly connected to the yoke and the grip, a blade support connected to the grip and the outboard bearing assembly, and a rotor blade connected to the blade support at a lockable connection and at a pivotable connection with axially aligned blade bolts providing a pivot axis inboard of the outboard bearing assembly;
unlocking the lockable connection; and
rotating the rotor blade about the pivot axis.

17. The method of claim 16, wherein the inboard bearing assembly further comprises an inboard shear bearing and an inboard centrifugal force ("CF") bearing.

18. The method of claim 16, wherein the outboard bearing assembly further comprises an outboard shear bearing.

19. The method of claim 16, wherein the rotor blade assembly is connected to a nacelle pivotally mounted to a wing.

20. The method of claim 16, wherein the rotor blade assembly is mounted to a wing and the wing is mounted to a fuselage.

* * * * *